(12) United States Patent
Shaked et al.

(10) Patent No.: US 10,471,743 B2
(45) Date of Patent: *Nov. 12, 2019

(54) PRINTER AND A METHOD OF PRINTING

(71) Applicant: HP SCITEX LTD., Netanya (IL)

(72) Inventors: Doron Shaked, Tivon (IL); Carl Staelin, Haifa (IL); Oren Perets, Netanya (IL); Eviatar Halevi, Netanya (IL); Yuval Dim, Moshav Haniel (IL)

(73) Assignee: HP SCITEX LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,929

(22) Filed: Dec. 4, 2017

(65) Prior Publication Data

US 2018/0086111 A1   Mar. 29, 2018

Related U.S. Application Data

(63) Continuation of application No. 14/130,448, filed as application No. PCT/IL2011/000528 on Jul. 5, 2011, now Pat. No. 9,849,697.

(51) Int. Cl.
*B41J 11/00* (2006.01)
*G06K 15/12* (2006.01)
*G06K 15/10* (2006.01)
*B41J 2/21* (2006.01)

(52) U.S. Cl.
CPC ......... *B41J 11/008* (2013.01); *B41J 2/2135* (2013.01); *B41J 2/2146* (2013.01); *G06K 15/102* (2013.01); *G06K 15/12* (2013.01)

(58) Field of Classification Search
CPC ........ B41J 11/46; B41J 13/00; B41J 13/0027; B41J 2/01; B41J 2202/11; H04N 1/00968; H04N 1/506; G06F 3/1253; B41F 33/0036
See application file for complete search history.

(56) References Cited

U.S. PATENT DOCUMENTS

| 5,967,676 | A   | 10/1999 | Cutler et al. |
| 6,373,590 | B1* | 4/2002  | Ancin ................. H04N 1/3876 358/1.18 |
| 6,377,703 | B1  | 4/2002  | Yeung |
| 7,033,097 | B2  | 4/2006  | Petteruti et al. |

(Continued)

FOREIGN PATENT DOCUMENTS

| CN | 101905570 A | 12/2010 |
| CN | 101905576 A | 12/2010 |

(Continued)

OTHER PUBLICATIONS

HPIP, International Search Report and Written Opinion dated Dec. 5, 2011, PCT App. No. PCT/IL2011/000528, 12 p.

*Primary Examiner* — Iriana Cruz
(74) *Attorney, Agent, or Firm* — HP Inc. Patent Department

(57) ABSTRACT

According to one example of the present invention there is provided a method of printing, with a printer, an image on a substrate, the printer comprising a substrate support. The method comprises obtaining an image to be printed, determining an offset position of a substrate positioned on the substrate support relative to a predetermined reference printing position, and controlling the printer to print the image to be printed at the determined offset position.

20 Claims, 6 Drawing Sheets

(56) References Cited

U.S. PATENT DOCUMENTS

| | | |
|---|---|---|
| 7,543,905 B2 | 6/2009 | Rius et al. |
| 7,934,828 B2 | 5/2011 | Kwon et al. |
| 7,943,202 B2 | 5/2011 | Chui et al. |
| 2004/0018035 A1 | 1/2004 | Petteruti et al. |
| 2005/0057593 A1 | 3/2005 | Kachi |
| 2006/0050099 A1 | 3/2006 | Murakami et al. |
| 2007/0064055 A1 | 3/2007 | Silverbrook |
| 2007/0222817 A1 | 9/2007 | Kurita et al. |
| 2007/0236535 A1 | 10/2007 | Baker et al. |
| 2008/0048393 A1* | 2/2008 | Giacometto .......... B41J 3/4075 271/265.03 |
| 2008/0145123 A1 | 6/2008 | Kogure et al. |
| 2008/0180479 A1 | 7/2008 | Rius et al. |
| 2009/0141060 A1 | 6/2009 | Kwon |
| 2009/0231374 A1 | 9/2009 | Van de Wynckel et al. |
| 2009/0244143 A1 | 10/2009 | Huang |
| 2009/0279173 A1 | 11/2009 | Chui et al. |
| 2009/0295855 A1 | 12/2009 | Walmsley |
| 2010/0295915 A1 | 11/2010 | Karszes et al. |
| 2011/0013202 A1* | 1/2011 | Muramatsu ........ G03G 15/5062 358/1.2 |
| 2011/0090277 A1 | 4/2011 | Pomerantz |

FOREIGN PATENT DOCUMENTS

| | | |
|---|---|---|
| CN | 102001222 A | 4/2011 |
| CN | 102026814 A | 4/2011 |
| EP | 1839884 | 10/2007 |
| EP | 2508347 | 10/2012 |
| JP | 2005038122 A | 2/2005 |
| JP | 2006102997 A | 4/2006 |
| WO | WO-2013005204 A1 | 1/2013 |

* cited by examiner

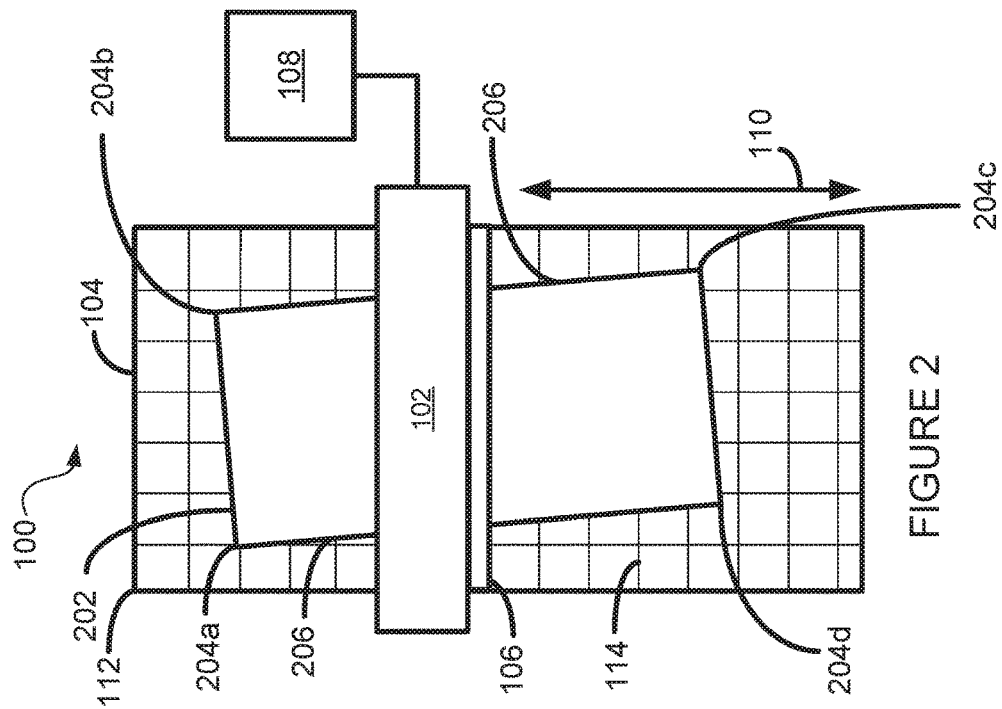
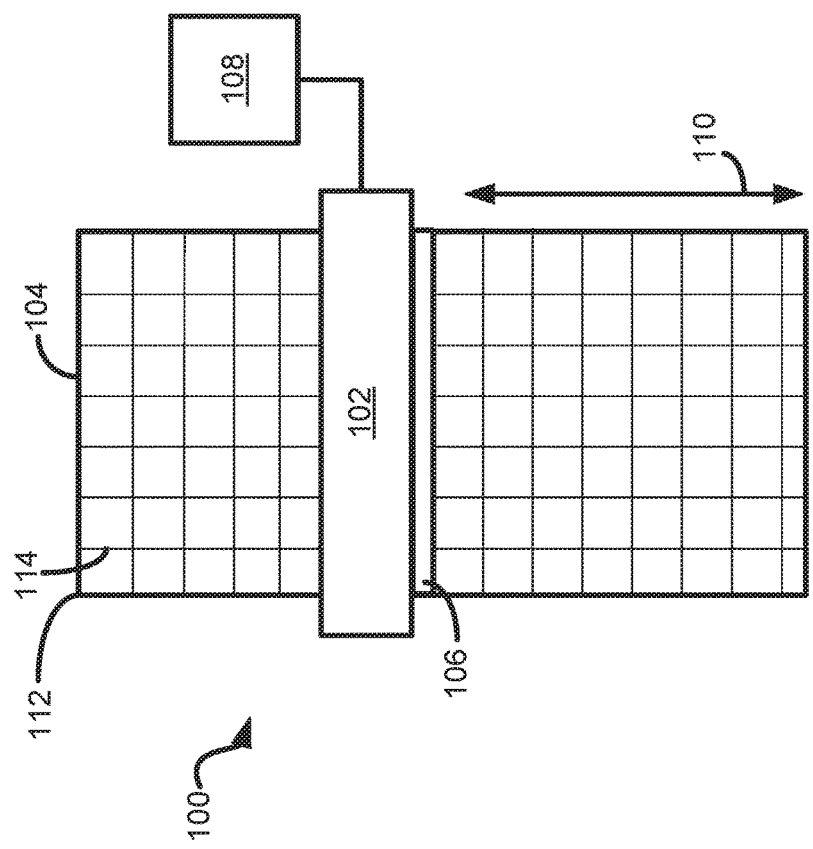

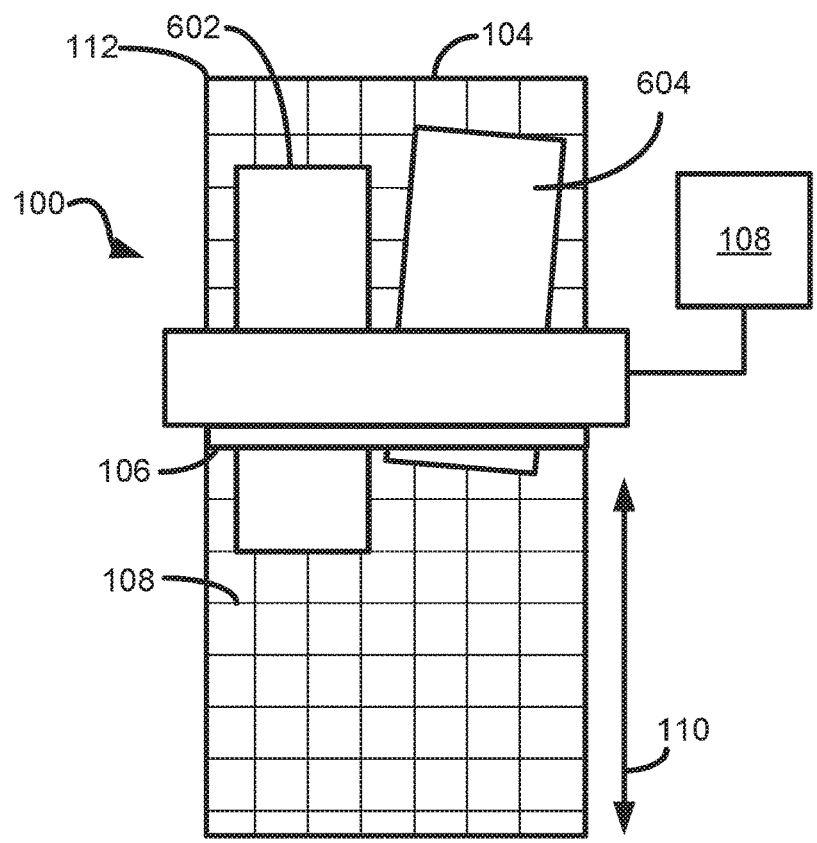
FIGURE 6
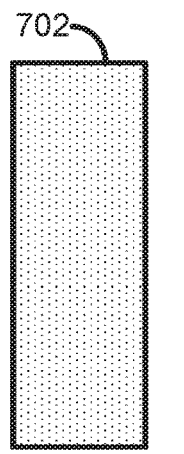 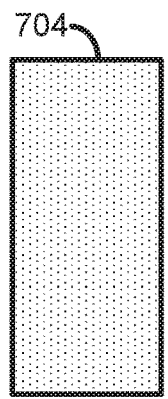
FIGURE 7a
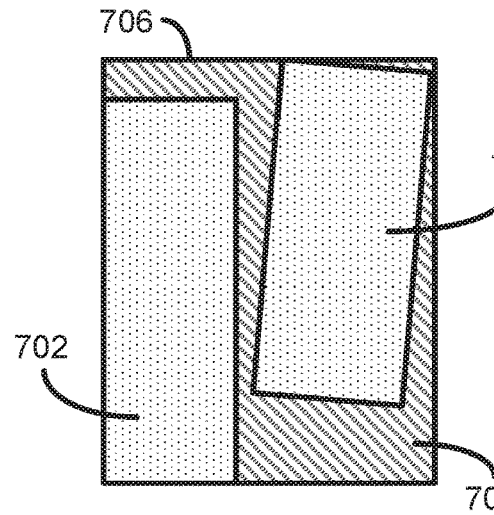
FIGURE 7b

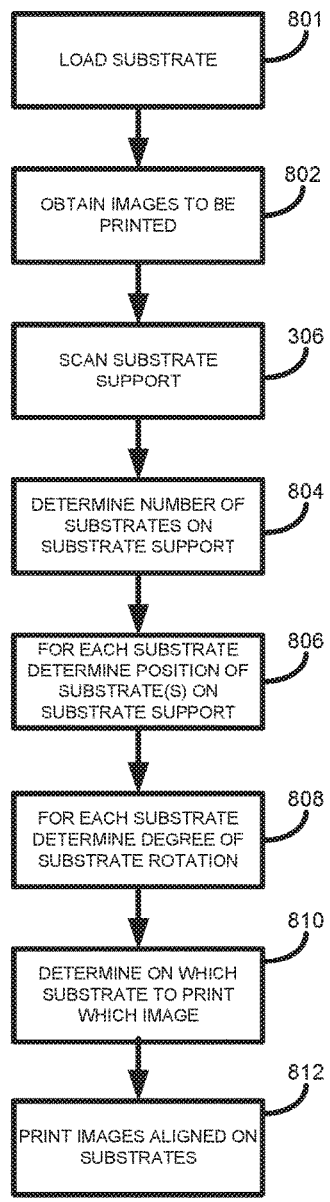
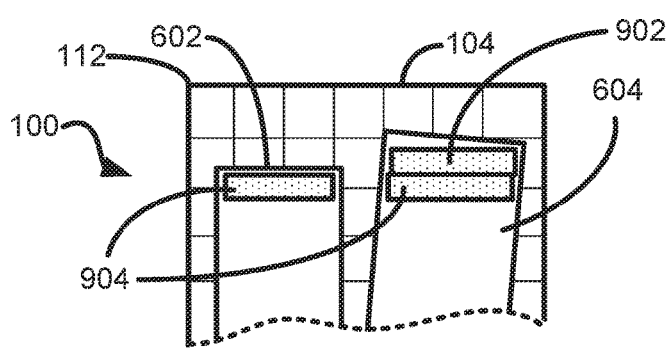
FIGURE 8
FIGURE 9

PRINTER AND A METHOD OF PRINTING

BACKGROUND

In a digital printing apparatus, such as an inkjet or laser printer, an image pipeline is used to convert an image to be printed into instructions or data that are used to control an image writing mechanism, such as an inkjet printhead or laser writing mechanism.

For a printer to accurately print an image on a substrate the substrate has to be both accurately aligned relative to a predetermined axis, such as a printing axis, and be accurately positioned relative to a predetermined reference printing position. The printing predetermined axis may, for example, be defined as an axis of relative movement between an image writing mechanism and a substrate within a printing apparatus.

If the substrate is not accurately aligned to the predetermined axis, the printed image will be printed skewed relative to the substrate. If the substrate is aligned with the predetermined axis but is offset relative to the predetermined reference position, the printed image may, for example, be printed partly on the substrate and partly on a printer substrate support, or the image may otherwise not be located in a desired location on the substrate.

Accurate positioning of the substrate may be achieved using various techniques. For example, some printers use one or multiple accurately placed mechanical substrate guides, against which a substrate is placed, thereby helping to ensure that the substrate is both correctly positioned and correctly aligned. Other printers may include mechanical registration pins, stoppers, or the like.

Accurate substrate positioning becomes increasingly important as substrate size increases. For example, with a 1 meter wide by 3 meter long substrate, even a slight misalignment can lead to a noticeable skew of the printed image, potentially leading to the print being unusable, leading to waste of both substrate and ink, and reducing printer throughput.

In some printers, a human operator may load a substrate into a printer. The operator is responsible for ensuring the correct alignment of the substrate. However, the use of a human operator to accurately load substrates is generally time-consuming and costly.

In other printers, substrate loading mechanisms may be used. However, such loading mechanisms have to be able to repeatedly load substrates with a high degree of precision. However, such mechanisms add cost and complexity to printers.

BRIEF DESCRIPTION

Examples of principles described herein will now be described, by way of non-limiting example only, with reference to the accompanying drawings, in which:

FIG. 1 is a simplified block diagram of a printer according to one example;

FIG. 2 is a simplified block diagram of printer loaded with a substrate according to one example;

FIG. 6 is a simplified block diagram of printer loaded with multiple substrates according to one example;

FIG. 7a is a diagram illustrating images to be printed;

FIG. 7b is a diagram illustrating an image to be printed according to one example;

FIG. 8 is simplified flow diagram outlining a method of operating a printer according to one example; and FIG. 9 shows a simplified and expanded partial view of the result of he printing operation performed by a printer according to one example.

DETAILED DESCRIPTION

Figure 3:
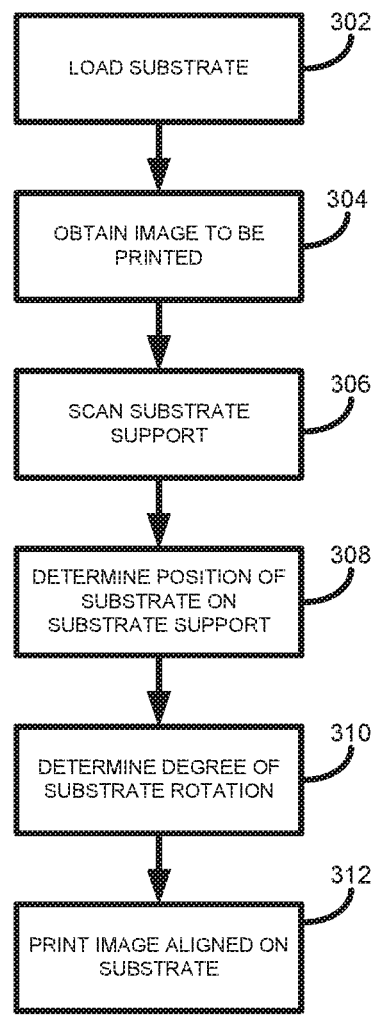
FIG. 3 is simplified flow diagram outlining a method of operating a printer according to one example.

Referring now to FIG. 1 there shown a simplified illustration of a printer 100 according to principles described herein.

The printer 100 comprises a writing mechanism 102 such as an inkjet writing mechanism. The writing mechanism 102 may, in one example, be a scanning or non-scanning inkjet printhead or array of printheads. In one example a laser writing mechanism may be used. In one example the writing mechanism 102 is mounted on a carriage or gantry.

The printer 100 further comprises a substrate support 104. In the example shown the substrate support 104 is a flat table or bed. In other examples, the substrate support may be a conveyor belt, a drum, or a roller. In some examples the substrate support 104 may include a vacuum mechanism (not shown) to securely hold a substrate to the substrate support during a printing operation.

Operation of the printer 100 is controlled by a printer controller 108. The printer controller 108 may, in one example, comprise a microprocessor, and a memory on which are stored processor executable instructions. In one example the processor executable instructions, when executed by the processor, control operation of the printer 100 in accordance with principles described herein.

A substrate imaging module 106 is provided above the substrate support 104 and adjacent to the writing mechanism 102. In one example the substrate imaging module 106 is located proximate to the writing mechanism 102. In one example the substrate imaging module 106 is mounted on the carriage or gantry on which the writing mechanism is mounted. The substrate imaging module 106 is able to generate an image of at least a portion of the substrate support 104 from which the position and orientation of a substrate placed on the substrate support 104 can be determined, as will be described further below.

In one example the substrate imaging module 106 comprises one or an array of imaging elements or optical sensor elements such as charged-coupled devices (CCD), contact image sensors (CIS), digital cameras, or the like. The printer controller 108 may control the substrate imaging module 106 and further control movement of the substrate support 104 to cause the substrate support 104, or a portion thereof, to move below the substrate imaging module 106, thereby enabling a scanned two-dimensional image of the substrate 202 and at least a portion of the substrate support 104 to be obtained. In a further example the printer controller 108 may control movement of the carriage or gantry on which the substrate imaging module 106 is mounted to cause the substrate imaging module 106 to move relative to the substrate support. In one example the scanned image may be stored in a suitable memory (not shown).

The writing mechanism 102 and substrate support 104 are arranged to allow relative movement between each other in a print axis 110 which is substantially perpendicular to writing mechanism 102. In one example, the substrate support 104 moves relative to the writing mechanism 102 which remains static. In another example, the writing mechanism 102 moves relative to the substrate support 104 which remains static.

The printer 100 has a predetermined reference printing position, In the present example a predetermined reference printing position 112 is located at the top left-hand corner of the substrate support 104. In other examples, the predetermined reference printing position may be located elsewhere.

In one example, the substrate support 104 includes a grid or other alignment features, marks, or indicators 114. In the example shown in FIG. 1 the grid 114 is in the form of a regular square grid pattern. In other examples, however, any suitable non-regular or non-square grid pattern may be used. In the present example the grid 114 is printed on, or is suitably incorporated into, the substrate support 104 such that at least a portion of the grid (or alignment features) is detectable in the image data generated by the substrate imaging module 106. In one example the alignment features may be the vacuum orifices positioned in the substrate support 102.

A method of operating the printer 100 according an example of principles described herein will now be described with further reference to FIGS. 2, 3, and 4.

Figure 4A:
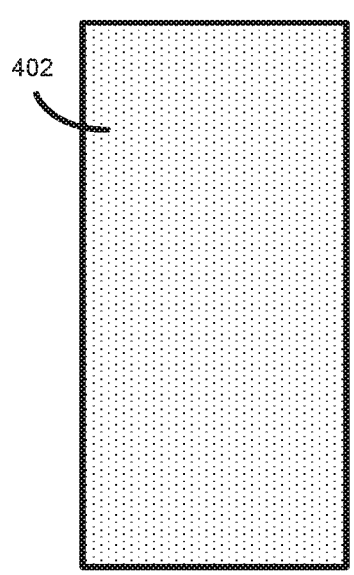
FIG. 4a is a diagram illustrating an image to be printed.

FIG. 2 shows the printer of FIG. 1 onto which a substrate 202 is loaded (block 302, FIG. 3). The substrate 202 may, for example, have been loaded manually by a human operator, or may have been loaded by a mechanical loading mechanism (not shown). As previously mentioned, in at least one example the substrate 202 may be held securely against the substrate support 104 by a vacuum system (not shown).

As can be seen in FIG. 2, the substrate 202 has been placed on the substrate support 104 in a way that the edges 206 of the substrate 202 are not aligned parallel with the printing axis 110.

Once a substrate has been suitably loaded, at block 304 (FIG. 3) an image 402 (FIG. 4a) to be printed on the substrate 202 is obtained. In one example, the image to be printed may be obtained prior to, concurrent to, or after, the substrate being loaded. The image 402 to be printed may, for example, include any kind of printable image, such as a photograph, a drawing, a picture, a document, etc. The image 402 may be obtained, for example, by the printer controller 108 receiving a print job, a file, or a bitmap of an image to be printed, At block 306, the substrate imaging module 106 produces image data representing a visual representation of at least a portion of the substrate support 104 and a substrate 202 positioned thereon.

In one example an image of the grid 114 of the substrate support 102 is obtained, without any substrate loaded thereon, during a calibration operation, The image is stored by the printer controller (108) and is used as a reference for subsequently locating a substrate positioned on the substrate support 102. Depending on the technical characteristics of the imaging elements in the substrate imaging module 106, the scanned image of the grid 114b may exhibit distortion, for example barrel or pincushion lens distortion. Using known characteristics of the grid 114 enables the printer controller 108 to electronically compensate for any such distortion, for example, by generating a correction and applying the correction to images obtained using the substrate imaging module 106. One advantage of this approach is that it enables the use of lower quality, and hence generally cheaper, imaging elements, without compromising the accuracy with which the position of a substrate on the substrate support may be determined.

Using the obtained image data obtained from the substrate imaging module 106, the printer controller 108 determines (block 308) the position of the substrate 202 on the substrate support 104. In one example, the printer controller 108 determines the position of the substrate 202 by visually identifying, in the image data, elements of the grid 114 on the substrate support 104 and using the identified elements to determine the position of the substrate.

In another example, the printer controller 108 determines (308) the position of a substrate placed on the substrate support 104 by detecting differences in one or more visual characteristics. For example, in one example the printer controller 108 may use a difference in contrast, brightness, colour, etc., between the substrate support 104 and a substrate placed thereon. In another example, suitable edge detection techniques may be used to determine the edges of the substrate.

The printer controller 108 may, for example, determine an offset position of the substrate 202 relative to the predetermined reference printing position 112 using an appropriate coordinate or measurement system.

The accuracy with which the printer controller 108 is able to determine the position of the substrate 202 on the substrate support 104 may depend, for example, on the quality of the optical sensor elements used in the substrate imaging module 106, on the size of the grid or visual indications visible on the substrate support. Different size grid elements may be used in different examples depending on the accuracy required.

In the present example, and as shown in FIG. 2, a rectangular substrate is placed on the substrate support 104. In this example, the printer controller 108 determines, from the image generated by the substrate imaging module 106, the coordinates of the location of each of the four corners 204a to 204d of the substrate 202. In other examples, other non-rectangular or irregular substrate shapes may be placed on the substrate support 104. In such an example, the printer controller 108 may determine a plurality of points along a boundary or edge of the substrate 202.

At block 310 the printer controller 108 determines whether the position of the substrate 202 location/position is skewed or rotated relative to a predetermined reference axis, such as for example the printing axis 110. The degree of skew or rotation may be determined, for example, through use of any appropriate geometric techniques. In one example the predetermined reference axis may be aligned parallel with an edge of the substrate support 104. In another example the predetermined reference axis may be aligned with the grid 114 visible on the substrate support 104. In a further example, the grid 114 may not be aligned parallel with an edge of the substrate support 104.

At block 312 the printer controller 108 controls the printer 100 to print the obtained image such that the edges of the printed image are aligned, or at least substantially aligned, with the edges of the substrate 202.

In one example, if the print controller 108 determines that there is no rotation of the substrate 202, the print controller 108 controls the writing mechanism 102 to print the obtained image 402 with an x and y-axis offset relative to the predetermined reference position, with the x and y-axis offset amount being based on the determined position of the substrate 202. The x and y axis offset may have a value of zero depending on the position of the substrate 202 on the substrate support 104.

If, at 310, the printer controller 108 determines that there is a degree of rotation of the substrate, the print controller 108 causes the obtained image 402 to be printed such that at least some of the edges of the printed image are aligned, or are at least substantially aligned, with the edges of the substrate 202.

Figure 4B:
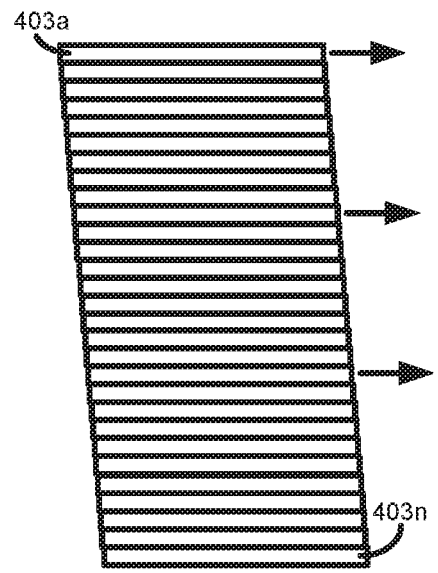
FIG. 4b is a diagram illustrating an image modified using a pixel shifting technique according to one example.

In a first example, if the print controller 108 determines that there is a degree of rotation of the substrate with respect to the predetermined reference axis, the print controller 108 controls the writing mechanism 102 to print the image 402 such that it is aligned with the substrate 202 by shifting, adding an offset to or otherwise altering the printing starting position of different ones of the lines of pixels of the image to be printed, as shown in FIG. 4b. In FIG. 4b each line of pixels 403 of the image 402 is shifted to the right by an amount corresponding to the determined degree of rotation of the substrate 202. For example, each line of pixels of an image may be shifted by zero, one, or more pixels relative to an adjacent line of pixels, depending on the degree of substrate rotation.

Figure 4C:
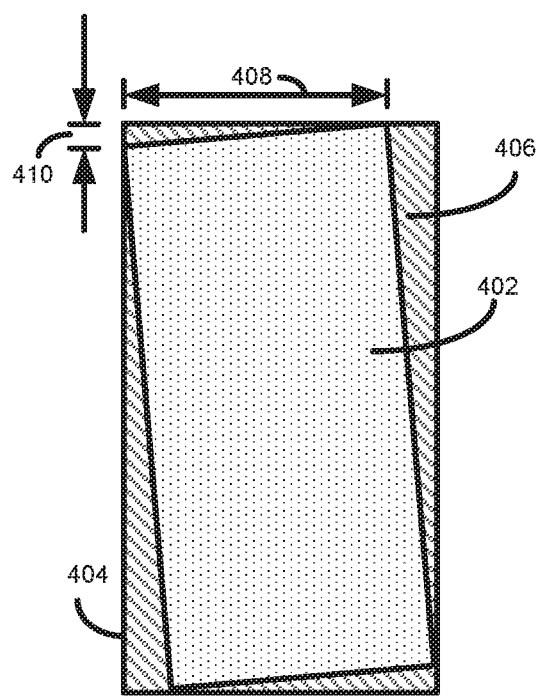
FIG. 4c is a diagram illustrating an image to be printed according to one example.

In one example, different lines of pixels may be shifted by a different amount relative to an adjacent line of pixels. For example, one line of pixels may be shifted by one pixel whereas an adjacent line of pixels may not be shifted, or may be shifted by more than one pixel. In other examples, lines of pixels may be shifted in the opposite direction depending on the angle of rotation of the substrate. In a yet further example, columns of pixels may be shifted up or down depending on the angle of rotation. It should be noted that the size of the lines of pixels shown in FIG. 4c is shown to clearly show the effect of the pixel shifting, and does not represent actual pixel sizes.

For many types of image content, and for a range of rotation angles, the above-described techniques may be used without introducing significant or noticeable artifacts into the printed image. It should be noted that using the pixel shifting techniques described above enables an image to be printed in an aligned or substantially aligned manner on a substrate that is rotated by a small amount. The degree of rotation that may be acceptably compensated for using this technique may depend, for example, of the size of the substrate, the type of image to be printed, and the intended viewing distance of the printed image.

It should be further noted that such a pixel shifting technique may be performed extremely quickly, which enables small degrees of rotation of a substrate to be compensated for in real-time, or in substantially real-time, during a printing operation. In high-speed printers such an approach is highly advantageous since no or little delay is introduced.

In a further example, if the print controller 108 determines that there is a degree of rotation of the substrate, the print controller 108 performs a geometric rotation of the image 402 using a suitable image rotation algorithm or technique, such as a computational rotation algorithm. Use of a geometric rotation technique enables the obtained image 402 to be printed on a substrate 202 that has any degree of rotation. In this example, the result of performing the rotation on the image to be printed 402 is to create a modified image 404 in which the original image 402 is incorporated.

As can be seen in FIG. 4c, as a result of the rotation the modified image 404 includes 'white space' 406 that does not result in the printer 100 printing any ink. The amount of white space 406 present may depend on the degree of rotation performed.

At block 312 the printer controller 108 controls the printer 100 to print the modified image or bitmap 404 at the determined position of the substrate 202.

As shown in FIG. 4c, it can be seen that the modified image 404 is to be printed starting from a y-axis off-set 410 relative to the determined position of the upper left-hand corner 204a of the substrate 202, and with an x-axis off-set 408 relative to the determined position of the upper right-hand corner 204b of the substrate 202.

If no skew was determined, the print controller 108 controls the printer 100 to print the original image 402 starting at the x and y axis position corresponding to the upper leftmost corner 204a of the substrate 202.

In this way, an image may be correctly and accurately printed on a substrate that is placed in substantially any arbitrary position on the substrate support 104. Using a geometric rotation, may, in certain circumstances, introduce a small delay whilst the rotation is applied to the obtained image 402, although with use of a suitable processor such a delay may be negligible. However, for images having certain types of content, such as line drawings, using a geometric rotation may result in less image artifacts being visible in the printed image compared to using pixel shifting.

In a still further example, a rotation of the substrate 202 may be compensated for, for example using the above described pixel shifting techniques, without having to perform a preliminary scan of the substrate support 104. In this example, the substrate imaging module 106 begins scanning the substrate support 104, for example starting from the top edge (FIG. 2) thereof. As the substrate imaging module 106 generates scanned image data, the printer controller 108 processes the generated image data to determine the position of the substrate 202 on the substrate support 104. When sufficient scanned image data has been generated, the printer controller 108 is able to determine, even based on a scan of a portion of the substrate 202, the position of and a degree of rotation (if any) of the substrate. In this example the substrate imaging module 106 and the writing mechanism 102 are sufficiently spaced apart in the direction of the printing axis that, by the time the printer controller 108 has obtained sufficient scanned image data to determine the location and degree of rotation (if any) of the substrate 202, the swath of the writing mechanism 102 is over at least part of the substrate 202. In this way, the printing controller 108 can calculate a degree of rotation of the substrate 202 and can introduce an offset into lines or columns of pixels of the image to be printed 402 such that the image 402 is printed substantially aligned with the substrate 202.

Figure 5:
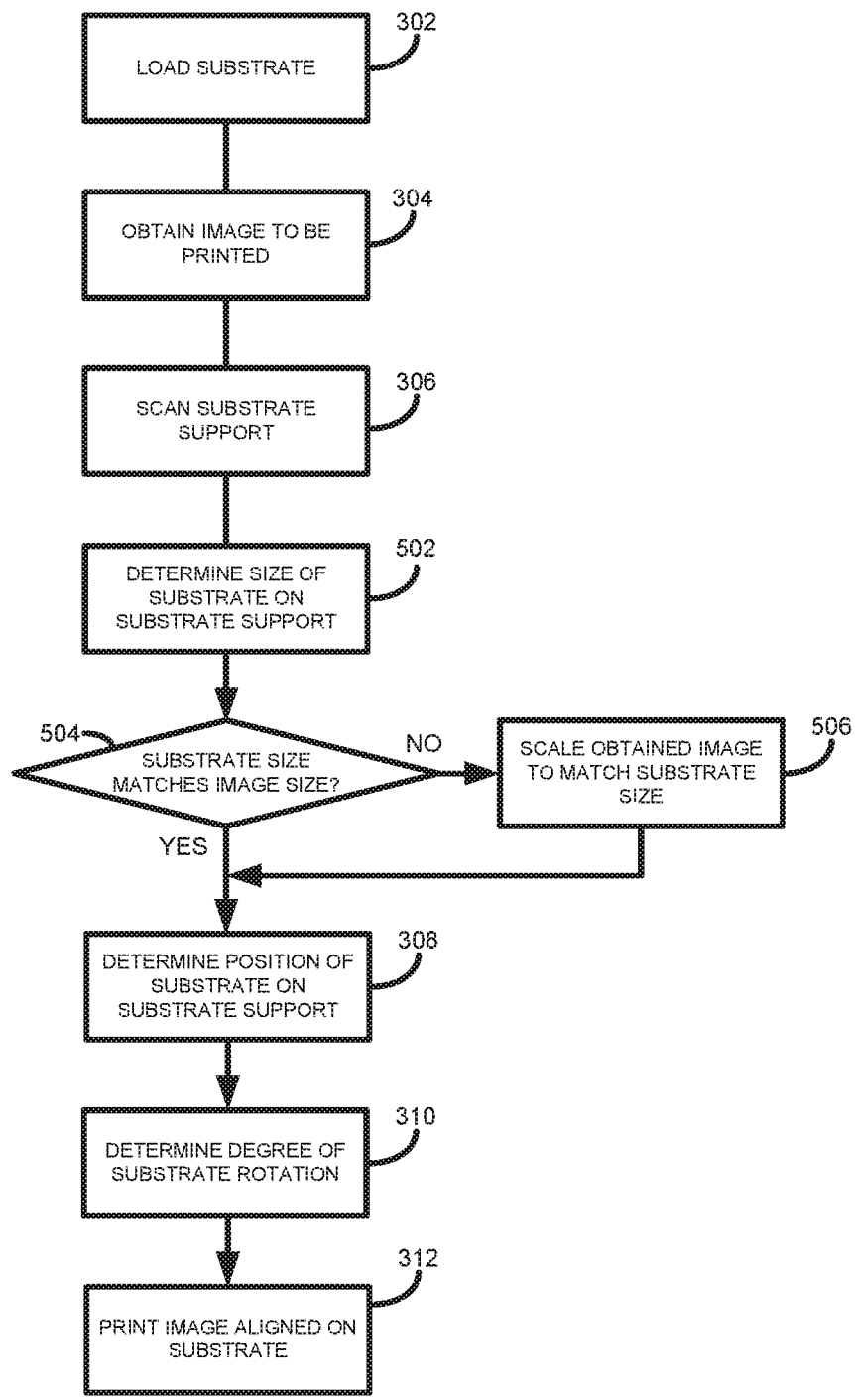
FIG. 5 is simplified flow diagram outlining a method of operating a printer according to one example.

Referring now to FIG. 5, a yet further example method of operating the printer 100 will now be described.

In this example, blocks 302 to 316 are performed as described above. At block 502 the printer controller 108 additionally determines, from the generated image data, the size of the substrate 202 on the substrate support 104. At 504 the printer controller 108 determines whether the determined size of the substrate 202 is the same size, or has the same dimensions, as the obtained image to be printed 402. If the printer controller 108 determines that the sizes, or dimensions, are the same, blocks 308, 310, and 312 are followed as described above.

If, however, it is determined that the sizes are not the same, the printer controller 108 scales (block 506) the obtained image 402 to match the determined size of the substrate 202. For example, if it is determined that the substrate 202 is smaller than the size of the image to be printed 404, the printer controller 108 reduces or down-scales the size of the image 404 to match the determined size of the substrate 202. Similarly, if it is determined that the substrate 202 is larger than the size of the image to be printed 404, the printer controller 108 increases or up-scales the size of the image 404 to match the determined size of the substrate 202. Any suitable image scaling techniques may be used. The blocks 308, 310, and 312, are then followed as previously described.

An image to be printed may include a clean or clear border or frame around the image, so that once printed on a substrate the image is surrounded by an ink-free border. However, the use of scaling enables such images to be printed as so-called edge-to-edge or 'full bleed' images, wherein the printed image covers the substrate from edge-to-edge. The techniques and principles described herein enable accurate edge-to-edge printing to be achieved on an arbitrarily aligned substrate, which may lead to the elimination of post-printing processing such as substrate trimming.

The flexibility enabled by principles described herein allow, in a yet further example, multiple substrates to be positioned on a substrate support thereby allowing multiple images to be printed to be received by the printer, with each image being printed on a different one of the substrates, as described below with additional reference to FIGS. 6, 7, and 8.

FIG. 6 shows the printer 100 on which two substrates 602 and 604 have been loaded on the substrate support 104. In other examples more than two substrates may be loaded (block 801, FIG. 8) on the substrate support 104.

In this example the printer obtains (block 802, FIG. 8) a plurality of images 702 and 704 to be printed, as shown in FIG. 7. In this example the substrates 602 and 604 loaded on the substrate support 104 are chosen to substantially correspond with the sizes of the obtained images to be printed 702 and 704, and are placed on the substrate support 104 in the order in which the images 702 and 704 are obtained.

At block 306 (FIG. 8), the substrate imaging module 106 obtains image data of the substrate support 104 and any substrates positioned thereon. At 804 (FIG. 8) the printer controller 108 processes the image data obtained from the substrate imaging module 106 to determine the number of substrates positioned on the substrate support 104.

At block 806, the printer controller 108 determines, for each identified substrate, the position of that substrate relative to the predetermined reference printing position 102. At block 808 the printer controller 108 determines, for each identified substrate, the degree of rotation of the substrate relative to a predetermined reference axis.

At block 810 the printer controller 108 determines which received image to print on which of the identified substrates. In this example, the printer controller 108 is arranged to print the first obtained image 702 on the left-hand substrate 602, and to print the second obtained image 704 on the right-hand substrate 604. Where more than two images to be printed are obtained a corresponding number of substrates are loaded onto the substrate support 104 the printer controller 108 may allocate each image to be printed on the loaded substrates.

At block 812 the printer controller 108 controllers the printer 100 to print each of the obtained images on its corresponding allocated substrate such that the edges of the printed image are aligned, or at least substantially aligned, with the edges of the substrate 202. As previously described, the printer controller 108 may, in one example, use pixel row or column shifting, and in another example may use geometric image rotation techniques. In a further example, the printer controller 108 may use scaling and or clipping to ensure that the images to be printed are printed at a desired size.

In one example, the printer controller 108 controls the printer 100 to print the first obtained image on the determined one of the substrates, and then subsequently controls the printer 100 to print the second obtained image on the determined other one of the substrates.

In a further example, as shown in FIG. 7*b*, the printer controller 108 generates a new image or bitmap 706 that includes the images to be printed 702 and 704. As shown in FIG. 7*b*, the position and rotation of each of the images 702 and 704 within the bitmap 706 are arranged such that they match or substantially match the relative positions of the substrates 602 and 604 on the substrate support 104. In this way, the printer controller 108 controls the printer 100 to print the bitmap 706 from a determined starting position, such that the image 702 is printed on the substrate 602 and the image 704 is printed on the substrate 604. In other examples, a new job description format (JDF), or a new vector description file may be generated instead of a bitmap.

FIG. 9 shows a simplified and expanded partial view of the result of the printer 100 shown in FIG. 6 having printed a first line of pixels 902 and a second line of pixels 904.

In a yet further example, the substrates 602 and 604 loaded on the substrate support 104 may be chosen not to substantially correspond to the sizes of the obtained images to be printed 702 and 704, and may be placed in any position on the substrate support 104, and not necessarily corresponding to the order in which the images 702 and 704 are obtained.

In this example at block 810 the printer controller 108 determines which received image to print on which of the identified substrates by matching the determined sizes of each of the loaded substrates with the sizes of each of the images to be printed. Consider, for example, the case where the print controller 108 obtains two images to be printed—one square, and one rectangular. If a square and a rectangular substrate are loaded onto the substrate support the printer controller 108 will determine to print the square image on the square substrate, and the rectangular image on the rectangular substrate. As appropriate, the printer controller 108 may modify the image to be printed, for example to compensate for a rotation of the substrate or to apply a scaling to the image, as previously described.

Where the sizes or shapes of the substrates loaded on the substrate support 104 do not match or do not closely match the size of the images to be printed, the printer controller 108 may, for example, attempt to determine a best fit, for example by applying a scaling or image transformation to enable the obtained images to be printed on the loaded substrates. In one example, where the sizes or shapes of the substrates do not closely match, the printer controller 108 generates an alert or an alarm for a human operator.

In a still further example, if the image to be printed is only slightly larger, such as small percentage larger, than the determined size of the substrate, a digital trimming of the image is performed rather than a geometrical image scaling transformation. Such a digital trimming operation is computationally easy to perform and enables full-bleed images to be printed quickly and accurately on a substrate. In a yet further example, an image to be printed may be scaled to be slightly larger than the substrate on which it is to be printed to ensure that a full bleed image is printed.

Although the examples described above refer to pixel shifting, image rotation, image offsetting, and the like, it will be appreciated than in other examples any suitable image manipulation techniques may be applied to an image to be printed, in appropriate circumstances, to enable the image to be printed to be printed in substantially parallel alignment with the substrate on which it is printed.

Advantageously, the above described examples can help improve workflows in printing systems, for example by enabling pre-cut sheets of substrates to be used on which images may be directly printed. Such use of pre-cut sheets may help eliminate or reduce the amount of post-printing processing, such as cutting, thereby helping to improve processing times and reducing cost.

Furthermore, the techniques and principles described herein enable conventional substrates or printing media to be used.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printer comprising:
   a writing mechanism to print an image on a substrate;
   a substrate support to support the substrate during printing, from which:
      image data is acquired; and
      a skew of the substrate on the substrate support relative to a reference printing position is determined; and
   a printer controller to adjust printing of the image to correct for the determined skew.

2. The printer of claim 1, wherein the printer controller adjusts the printing of the image during a printing operation.

3. The printer of claim 1, wherein the printer controller determines the skew of the substrate on the substrate support by detecting at least one of a color difference, a contrast difference, and a brightness difference between the substrate support and the substrate.

4. The printer of claim 1, wherein the substrate support comprises a non-rectangular grid of alignment features which forms part of the image data from which a skew of the substrate on the substrate support relative to a reference printing position is determined.

5. The printer of claim 1, wherein adjusting printing of the image comprises at least one of pixel shifting and geometric rotation.

6. The printer of claim 1, wherein the printer controller determines an amount of skew during a printing operation.

7. The printer of claim 1, wherein the substrate support rotates.

8. A method comprising:
   acquiring image data representing a visual representation of at least a portion of elements of the substrate support and a substrate disposed thereon;
   from the image data of the substrate support elements, determining a position of the substrate on the substrate support;
   adjusting an image to be printed based on the position of the substrate; and
   printing the adjusted imaged on the substrate.

9. The method of claim 8, wherein:
   at least two substrates are disposed on the substrate support;
   at least two images are to be printed on the at least two substrates; and
   the method further comprises determining which image to print on which substrate.

10. The method of claim 9, wherein determining which image to print on which substrate comprises matching sizes of each of the substrates with the sizes of each of the images.

11. The method of claim 9, wherein determining which image to print on which substrate comprises determining a best fit match by applying an image transformation to at least one of the at least two images.

12. The method of claim 10, wherein adjusting an image to be printed based on the position of the substrate and printing the adjusted imaged on the substrate occur simultaneously.

13. The method of claim 8, wherein the image data is captured during a calibration period.

14. The method of claim 13, further comprising compensating for any distortion indicated in the image data captured during the calibration period.

15. A printer comprising:
   an imaging module to acquire image data representing a visual representation of at least a portion of elements of the substrate support and a substrate disposed thereon;
   a printer controller to:
      from the image data of the substrate support elements, determine a positon of the substrate on the substrate support; and
      adjust an image to be printed based on the position of the substrate; and
   a writing mechanism to print the adjusted imaged on the substrate.

16. The printer of claim 15, wherein the printer controller determines a position of the substrate and adjusts the image while the writing mechanism is printing the image to be printed.

17. The printer of claim 15, wherein the printer controller adjusts an image to be printed by performing pixel shifting where different lines of pixels are shifted by different amounts relative to adjacent lines of pixels.

18. The printer of claim 17, wherein adjacent lines of pixels are shifted in opposite directions.

19. The printer of claim 1, wherein a skew of the substrate on the substrate relative to a reference printing position is determined based on visual representations of elements of the substrate support in the image data.

20. The printer of claim 15, wherein the printer controller adjusts an image to be printed by shifting lines of pixels vertically.

* * * * *